United States Patent
Hayman

(10) Patent No.: US 8,627,744 B2
(45) Date of Patent: Jan. 14, 2014

(54) CRANKSHAFT FOR AN INTERNAL COMBUSTION ENGINE

(75) Inventor: Alan W. Hayman, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/428,551

(22) Filed: Mar. 23, 2012

(65) Prior Publication Data
US 2013/0247714 A1 Sep. 26, 2013

(51) Int. Cl.
*F16C 3/04* (2006.01)
*F02B 75/22* (2006.01)
*F16C 11/00* (2006.01)

(52) U.S. Cl.
USPC .......................................... 74/596; 123/54.7

(58) Field of Classification Search
USPC .......... 74/595–598, 602, 603; 123/52.1–52.6, 123/53.5, 54.7–54.8, 55.6
IPC ........................................ F16C 3/04,3/06, 3/08
See application file for complete search history.

(56) References Cited

U.S. PATENT DOCUMENTS

| | | | | |
|---|---|---|---|---|
| 1,202,741 A | * | 10/1916 | Landgraf | 123/54.7 |
| 1,916,522 A | * | 7/1933 | McCuen | 184/6.5 |
| 2,793,625 A | * | 5/1957 | Kolbe | 92/149 |
| 3,116,724 A | * | 1/1964 | Elger et al. | 123/54.8 |
| 5,513,601 A | * | 5/1996 | Benson | 123/54.4 |
| 7,100,548 B2 | * | 9/2006 | Takahashi et al. | 123/54.7 |

FOREIGN PATENT DOCUMENTS

| | | | |
|---|---|---|---|
| DE | 102008036174 A1 | * | 11/2009 |
| DE | 102009023295 A1 | * | 9/2010 |
| SU | 435367 | * | 7/1974 |

OTHER PUBLICATIONS

Machine translation of DE102009023295.*

* cited by examiner

*Primary Examiner* — James Pilkington
*Assistant Examiner* — Yamilka Pinero Medina
(74) *Attorney, Agent, or Firm* — Cantor Colburn LLP

(57) ABSTRACT

A crankshaft for an internal combustion engine comprises at least five main journals aligned on a crankshaft axis of rotation and at least eight crankpins, each of the crankpins being disposed about a respective crankpin axis and positioned between the main journals. Each of the respective crankpin axes is oriented parallel to, and spaced radially from, the crankshaft axis of rotation. Each of the crankpins is joined to a pair of crank arms for force transmission between each of the crankpins and the respective crank arms. Each crank arm is joined to a respective main journal for transmitting torque between the crank arm and the main journal. At least four of the crankpins are spaced radially a first semi-stroke distance from the crankshaft axis of rotation, and at least four remaining crankpins are spaced radially a second semi-stroke distance from the crankshaft axis of rotation.

19 Claims, 3 Drawing Sheets

CRANKSHAFT FOR AN INTERNAL COMBUSTION ENGINE

FIELD OF THE INVENTION

Exemplary embodiments of the invention relate to crankshafts for internal combustion engines and, more particularly, to a crankshaft for an internal combustion engine having a grouping of eight crankpins, in which all eight of the crankpins are disposed in a single plane, a first set of four of the crankpins is disposed a first distance from a centerline of the crankshaft and a second set of four of the crankpins is disposed a second distance from the centerline of the crankshaft.

BACKGROUND

With the increased focus on vehicle emissions, exhaust gas recirculation ("EGR") is utilized in many conventional internal combustion engines to assist in the reduction of throttling losses at low loads, to improve knock tolerance, and to reduce the level of oxides of nitrogen ("$NO_x$") in the exhaust gas at high engine loads. EGR is especially important as an emissions reducer in internal combustion engines that run lean of stoichiometry and thereby are prone to emitting higher levels of $NO_x$ emissions.

One proposition that has been considered in the construction of internal combustion engine systems is to utilize one or more of a plurality of cylinders as a dedicated source of EGR. For example, in an engine having two or more cylinders, the entire supply of exhaust gas produced in one of the cylinders is transferred to the intake ports of the other cylinders as EGR. In engines having greater numbers of cylinders (e.g., 4, 6, or 8 cylinders), timing considerations may cause it to be advantageous to dedicate up to half of the cylinders (i.e., 2, 3, or 4 cylinders) to the production of EGR.

A disadvantage to this type of internal combustion engine system is that an internal combustion engine that dedicates the use of one or more cylinders to production of EGR may not deliver EGR uniformly to the remaining cylinders. For example, the cylinder event following the dedicated EGR cylinder event may be prone to receive more EGR diluent than the subsequently firing cylinders. These variations in cylinder makeup (i.e. combustion air, fuel and EGR diluent) can result in uneven combustion performance that is difficult to control over a broad range of operating conditions. In addition, engines having displacements that are uniform among the cylinders, may be incapable of precisely delivering desired quantities of EGR.

To at least partially address these disadvantages, a number of configurations are being studied, including configurations wherein more than one in four cylinders operates as a dedicated EGR cylinder or where a dedicated EGR cylinder produces more than a single volume of exhaust gas for every four volumes of exhaust gas produced by other cylinders or where displacements of dedicated EGR cylinders differ from displacements of remaining cylinders. To enable such configurations, it would be advantageous to have a crankshaft that can facilitate improved distribution of EGR among non-EGR cylinders. It would also be advantageous to have a crankshaft that can enable cylinders displacements that differ between the EGR and non-EGR cylinders.

SUMMARY

In an exemplary embodiment, a crankshaft for an internal combustion engine comprises at least five main journals aligned on a crankshaft axis of rotation and at least eight crankpins, each of the crankpins being disposed about a respective crankpin axis and positioned between the main journals. Each of the respective crankpin axes is oriented parallel to, and spaced radially from, the crankshaft axis of rotation. Each of the crankpins is joined to a pair of crank arms for force transmission between each of the crankpins and the respective crank arms. Each crank arm is joined to a respective main journal for transmitting torque between the crank arm and the main journal. At least four of the crankpins are spaced radially a first semi-stroke distance from the crankshaft axis of rotation, and at least four remaining crankpins are spaced radially a second semi-stroke distance from the crankshaft axis of rotation.

In another exemplary embodiment, a crankshaft for an internal combustion engine comprises at least five main journals aligned on a crankshaft axis of rotation and at least eight crankpins, each being disposed about a respective crankpin axis and positioned between the main journals. Each of the respective crankpin axes is oriented parallel to, and spaced radially from, the crankshaft axis of rotation, and each of the at least eight crankpins is joined to a pair of crank arms for force transmission between each crankpin and a respective pair of crank arms. Each crank arm is joined to a respective main journal for transmitting torque between the crank arm and the main journal, and each respective crankpin axis of the at least eight crankpins and the crankshaft axis of rotation are disposed approximately in a single plane.

In another exemplary embodiment, a crankshaft for an internal combustion engine comprises at least five main journals aligned on a crankshaft axis of rotation and at least eight crankpins, each being disposed about a respective crankpin axis and positioned between the main journals. Each of the respective crankpin axes is oriented parallel to, and spaced radially from, the crankshaft axis of rotation, and each of the at least eight crankpins is joined to a pair of crank arms for force transmission between each of the crankpins and the respective pair of crank arms. Each crank arm is joined to a respective main journal for transmitting torque between the crank arm and the main journal. A first set of crankpins comprises at least four of the at least eight crankpins, and a second set of crankpins comprises a remaining at least four of the at least eight crankpins. The first set of crankpins is disposed approximately 180 degrees out of phase from the second set of crankpins.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
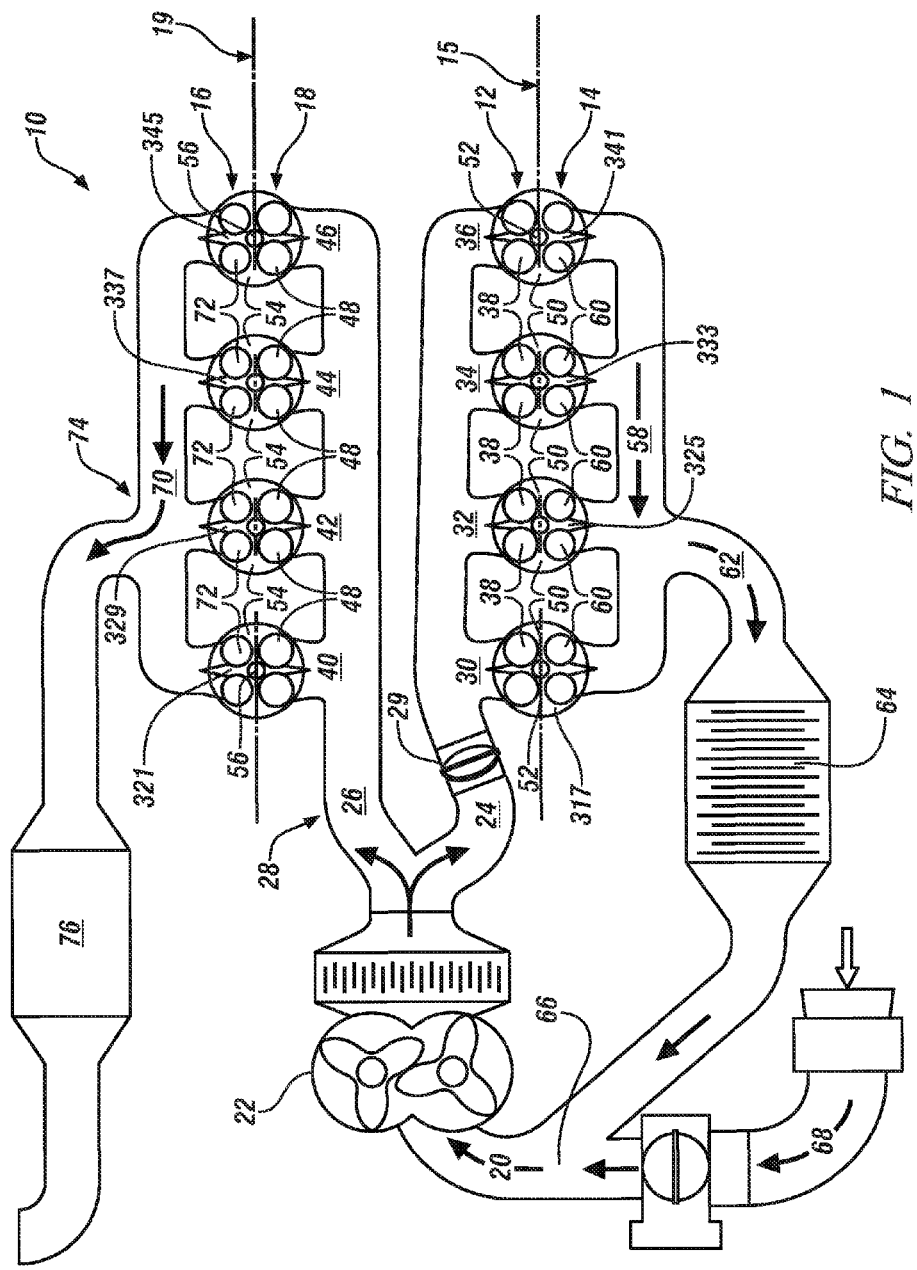
FIG. 1 is a schematic plan view of portions of an internal combustion engine system embodying features of the invention.

The following description is merely exemplary in nature and is not intended to limit the present disclosure, its application or uses. It should be understood that throughout the drawings, corresponding reference numerals indicate like or corresponding parts and features.

Figure 2:
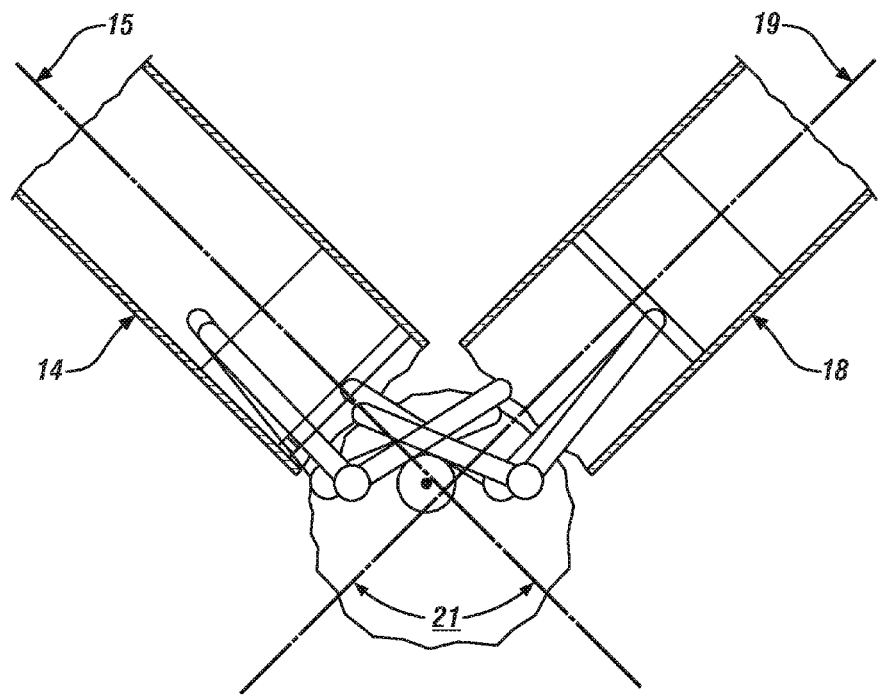
FIG. 2 is a schematic view of portions of an internal combustion engine system embodying features of another embodiment of the invention.

Referring now to FIG. 1 and FIG. 2, an exemplary embodiment of the invention is directed to an internal combustion engine system 10 comprising a plurality of dedicated EGR-producing cylinders 12 arranged in a left bank 14. Engine system 10 also comprises a plurality of EGR-consuming cylinders 16 arranged in a right bank 18. In the embodiment illustrated, the internal combustion engine system 10 includes four EGR-producing cylinders 12 and four EGR-consuming cylinders 16, however the configuration may also include any combination of number of EGR-producing cylinders and EGR-consuming cylinders (ex. 3, 4, 5, 6, 8, 10, 12, etc.) as well as configurations such as V-configured, horizontally opposed and the like, without affecting the application of the invention thereto. In an exemplary embodiment, both the EGR-producing cylinders 12 and the EGR-consuming cylinders 16 are configured to operate on a four-stroke combustion cycle.

In an exemplary embodiment, combustion air 20 is compressed by a compressor 22, which may comprise an engine driven supercharger, an exhaust driven turbocharger or a combination of both (i.e. super-turbocharger), before being split between a left branch 24 and a right branch 26 of an intake system 28. An EGR valve 29 controls distribution of combustion air 20 between left branch 24 and a right branch 26 of intake system 28. Combustion air 20 passing through the left branch 24 is delivered to each of the EGR-producing cylinders 12 through intake runners 30, 32, 34, and 36. The intake runners 30, 32, 34, and 36 deliver the compressed combustion air to the EGR-producing cylinders 12 of the left bank 14 through intake ports 38. Combustion air 20 passing through the right branch 26 is delivered to each of the EGR-consuming cylinders 16 through intake runners 40, 42, 44, and 46. The intake runners 40, 42, 44, and 46 deliver the compressed combustion air to the EGR-consuming cylinders 16 of the right bank 18 through intake ports 48.

The combustion air 20 is mixed with an EGR-producing flow of fuel 50 in the EGR-producing cylinders 12 and is combusted therein. One or more ignition devices such as spark plugs 52 are located in communication with the EGR-producing cylinders 12 and operate to ignite the fuel/air mixture therein at appropriate times. Similarly, the combustion air 20 is mixed with an EGR-consuming flow of fuel 54 in the EGR-consuming cylinders 16 and is combusted therein. One or more ignition devices such as spark plugs 56 are located in communication with the EGR-consuming cylinders 16 and operate to ignite the fuel/air mixture therein at appropriate times.

In an exemplary embodiment, with reference to the left bank 14 of internal combustion engine system 10, recirculation exhaust gas 58 from the combustion of the EGR-producing flow of fuel 50 and combustion air 20 in the EGR-producing cylinders 12 is removed from each cylinder 12 through one or more exhaust ports 60 in fluid communication with an EGR conduit 62. EGR conduit 62 carries recirculation exhaust gas 58 from exhaust ports 60 and through a heat exchanger 64 to an EGR mixer 66 that combines the recirculation exhaust gas 58 with a stream of intake air 68 to produce the combustion air 20. The heat exchanger 64 cools the recirculation exhaust gas 58, allowing for a cooler and, thus, more dense flow when combined with combustion air 20. The heat exchanger 64 may be of an air cooled or liquid cooled configuration.

In an exemplary embodiment, with reference to the right bank 18 of internal combustion engine system 10, discharge exhaust gas 70 from the combustion of the EGR-consuming flow of fuel 54 and combustion air 20 in the EGR-consuming cylinders 16 is removed from each cylinder 16 through one or more exhaust ports 72 in fluid communication with a discharge exhaust system 74. Discharge exhaust system 74 carries discharge exhaust gas 70 from exhaust ports 72 and through an exhaust treatment system 76 prior to being released to the atmosphere. The exhaust treatment system 76 may include various exhaust gas treatment devices such as a catalytic converter, a selective catalytic reduction device, a particulate trap or a combination thereof.

In an exemplary embodiment, the quantity of fuel mixed with the combustion air 20 in each of the EGR-producing cylinders 12 is controlled such that each of the EGR-producing cylinders 12 is operated at a customized level of air and fuel; as may be determined by an engine controller that is in signal communication with various engine, vehicle and exhaust system sensors. Since the exhaust gas discharged from the EGR-producing cylinders 12 is to be re-circulated and ultimately ingested in one of the EGR-consuming cylinders 16 before being released to the atmosphere, the customized air and fuel levels in each of the EGR-producing cylinders 12 may be optimized to achieve selected goals such as engine efficiency, power, and operability.

Since exhaust gas produced by the EGR-consuming cylinders 16 is to be released to the atmosphere, either directly or following treatment in an exhaust gas treatment system, the air and fuel mixtures of these EGR-consuming cylinders 16 may be operated so as to meet a number of goals, such as engine efficiency, power, and operability, as well as emission standards. Accordingly, the EGR-consuming cylinders 16 enjoy benefits associated with ingestion of EGR from the EGR-producing cylinders 12. These benefits include reduced combustion temperatures and associated levels of $NO_x$, allowing richer levels of EGR in the remaining cylinders with increased levels of hydrogen, thereby improving knock resistance, fuel consumption and combustion stability, while still allowing stoichiometric gas to be maintained in the exhaust gas treatment system for compatibility with the catalytic treatment devices. Accordingly, the mixing of the recirculation exhaust gas 58 with ambient air 68 to produce the combustion air 20 assists in the reduction of throttling losses at low loads and improves knock tolerance while reducing levels of oxides of nitrogen ("$NO_x$") in the discharge exhaust gas 70.

In an exemplary embodiment, the EGR-producing cylinders 12 and the EGR-consuming cylinders 16 interact with a rotating group that comprises pistons (not shown) that are each associated with a respective cylinder and connected through a respective connecting rod (not shown) to a respective crankpin, the crankpins being disposed on a single crankshaft. In an exemplary embodiment, a central axis defined by each EGR-producing cylinder 12 arranged in left bank 14 is parallel to, and coplanar with, each other central axis defined by each other EGR-producing cylinder 12 arranged in left bank 14. Thus, the central axes of the EGR-producing cylinders 12 define a left bank plane 15. In an exemplary embodiment, a central axis defined by each EGR-consuming cylinder 16 arranged in right bank 18 is parallel to, and coplanar with, each other central axis defined by each other EGR-consuming cylinder 16 arranged in right bank 18. Thus, the central axes of the EGR-consuming cylinders 16 define a right bank plane 19. In a V-configured embodiment, the left bank plane 15 and the right bank plane 19 intersect approximately at a crankshaft axis of rotation and form an engine block angle 21 between the left bank plane 15 and the right bank plane 19. In an exemplary embodiment, the engine block angle 21 is approximately 90 degrees.

Figure 3:
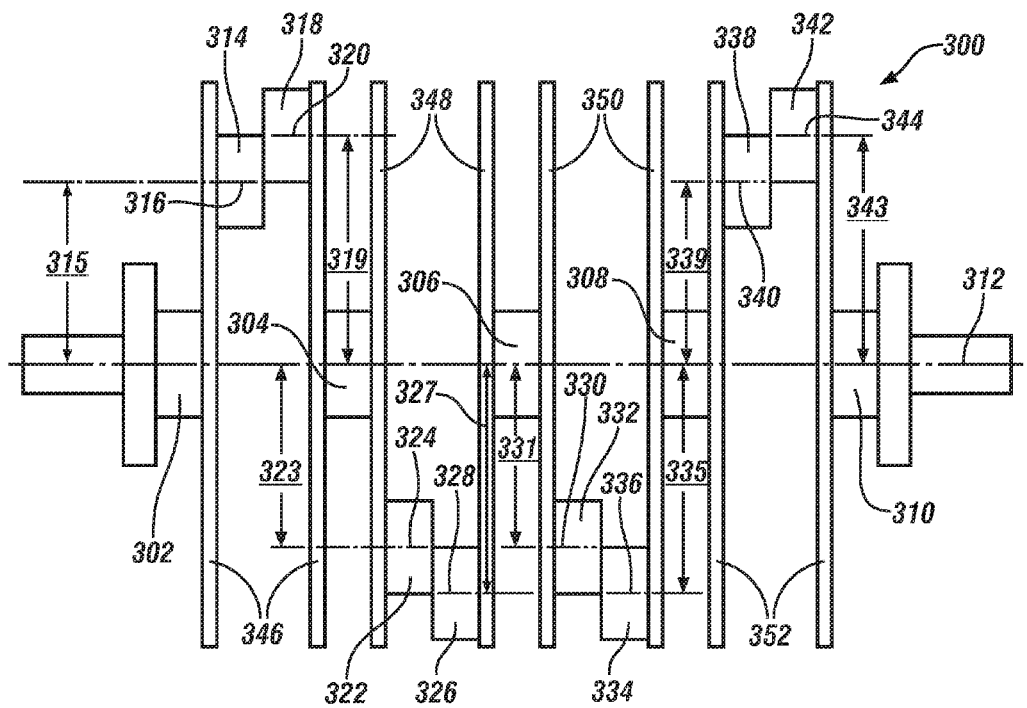
FIG. 3 is a schematic view of portions of an internal combustion engine system embodying features of another embodiment of the invention.

In an exemplary embodiment, as shown in FIG. 3, a crankshaft 300 for an internal combustion engine comprises a plurality of main journals 302, 304, 306, 308, 310 aligned sequentially on a crankshaft axis of rotation 312. A first crankpin 314 is disposed about a first crankpin axis 316 and positioned between a first main journal 302 and a second main journal 304. A second crankpin 318 is disposed about a second crankpin axis 320 and is also positioned between the first main journal 302 and the second main journal 304. A third crankpin 322 is disposed about a third crankpin axis 324 and positioned between the second main journal 304 and a third main journal 306.

A fourth crankpin 326 is disposed about a fourth crankpin axis 328 and is also positioned between the second main journal 304 and the third main journal 306. A fifth crankpin 330 is disposed about a fifth crankpin axis 332 and positioned between the third main journal 306 and a fourth main journal 308. A sixth crankpin 334 is disposed about a sixth crankpin axis 336 and is also positioned between the third main journal 306 and the fourth main journal 308. A seventh crankpin 338 is disposed about a seventh crankpin axis 340 and positioned between the fourth main journal 308 and a fifth main journal 310. An eighth crankpin 342 is disposed about an eighth crankpin axis 344 and is also positioned between the fourth main journal 308 and the fifth main journal 310.

Thus, each of the eight crankpins 314, 318, 322, 326, 330, 334, 338, 342 is disposed about a respective crankpin axis 316, 320, 324, 328, 332, 336, 340, 344 and positioned between two of the five main journals 302, 304, 306, 308, 310. In an exemplary embodiment, the eight crankpins 314, 318, 322, 326, 330, 334, 338, 342 are arranged in pairs (e.g., 314 and 318, 322 and 326, 330 and 334, 338 and 342), each pair of crankpins being disposed between two of the at least five main journals 302, 304, 306, 308, 310 (e.g., crankpins 314 and 318 are disposed between main journals 302 and 304, crankpins 322 and 326 are disposed between main journals 304 and 306, crankpins 330 and 334 are disposed between main journals 306 and 308, and crankpins 338 and 342 are disposed between main journals 308 and 310). In an exemplary embodiment, each crankpin axis 316, 320, 324, 328, 332, 336, 340, 344 is arranged parallel to, and spaced radially from, the crankshaft axis of rotation 312.

As discussed above, the EGR-producing cylinders 12 arranged in the left bank 14 are to be operated differently from the EGR-consuming cylinders 16 arranged in the right bank 18. For example, the EGR-producing cylinders 12 arranged in the left bank 14 are to be operated at different ratios of fuel to air than the EGR-consuming cylinders 16 arranged in the right bank 18. Accordingly, the power produced in an individual cylinder as a function of its displacement (i.e., specific power) may differ from that of other cylinders. In addition, as a result of the manner in which the left bank 14 and the right bank 18 are aspirated, the degree to which combustion air 20 comprises recirculation exhaust gas 58 depends upon the relative displacements of the EGR-producing cylinders 12 arranged in the left bank 14 and the EGR-consuming cylinders 16 arranged in the right bank 18. To at least partially compensate for these variations in specific power output and to produce desirable levels of EGR, it may be desirable to be able to modify the displacement of one or more of the cylinders relative to the displacements of the other cylinders, and, in particular, to modify the displacement of the EGR-producing cylinders relative to the displacements of the EGR-consuming cylinders.

Operating with cylinders of differing displacements can be desirable not only to compensate for varying specific power outputs, but can also be useful for adjusting EGR levels in engines where the exhaust gases from one or more cylinders are to be fully re-ingested in other cylinders. This can be accomplished by increasing or decreasing the stroke of the EGR-producing cylinders relative to the stroke of the EGR-consuming cylinders. The ability to vary the displacement of individual cylinders allows an engine designer to effectively trade-off the amount of EGR delivered to each of the EGR-consuming cylinders versus the amount of work to be produced by the cylinders. This capability can enable an engine designer to seek solutions to (i.e., trade-offs between) multiple simultaneous design constraints based on power output, fuel consumption, and emissions limitations.

Since displacement is a function of both stroke and bore diameter, cylinder displacement can be adjusted by changing either or both of these parameters. In an exemplary embodiment, a bore of each EGR-producing cylinder 12 is 85.0 mm, and a bore of each EGR-consuming cylinder 16 is 96.5 mm. A stroke of each EGR-producing cylinder 12 is 75.0 mm, and a stroke of each EGR-consuming cylinder 16 is 92.0 mm. Accordingly a displacement of the combined four EGR-producing cylinders 12 is 1702 cc, and a displacement of the combined four EGR-consuming cylinders 16 is 2691 cc. Since the recirculation exhaust gas 58 is combined with a stream of intake air 68 to produce the combustion air 20, the fraction of combustion air 20 that is recirculation exhaust gas 58 (i.e., the EGR fraction) is approximately equal to the ratio of: (a) the displacement of the combined four EGR-producing cylinders 12; to (b) the sum of the combined displacements of the four EGR-producing cylinders 12 and the combined displacements of the four EGR-consuming cylinders 16. In the exemplary embodiment described above, this EGR fraction is approximately 38.7%.

In an exemplary embodiment, the first crankpin 314 is mechanically coupled to a piston that interacts with a first EGR-producing cylinder 317, and the first crankpin axis 316 is spaced radially a semi-stroke distance 315 from the crankshaft axis of rotation 312. Similarly, the third crankpin 322 is mechanically coupled to a piston that interacts with a second EGR-producing cylinder 325, and the third crankpin axis 324 is spaced radially a semi-stroke distance 323 from the crankshaft axis of rotation 312. The fifth crankpin 330 is also mechanically coupled to a piston that interacts with a third EGR-producing cylinder 333, and the fifth crankpin axis 332 is spaced radially a semi-stroke distance 331 from the crankshaft axis of rotation 312. The seventh crankpin 338 is mechanically coupled to a piston that interacts with a fourth EGR-producing cylinder 341, and the seventh crankpin axis 340 is spaced radially a semi-stroke distance 339 from the crankshaft axis of rotation 312. In an exemplary embodiment, semi-stroke distances 315, 323, 331, and 339 are equal to one another (i.e., equal to a first semi-stroke distance).

In an exemplary embodiment, the second crankpin 318 is mechanically coupled to a piston that interacts with a first EGR-consuming cylinder 321. The second crankpin axis 320 is spaced radially a semi-stroke distance 319 from the crankshaft axis of rotation 312. Similarly, the fourth crankpin 326 is mechanically coupled to a piston that interacts with a second EGR-consuming cylinder 329, and the fourth crankpin axis 328 is spaced radially a semi-stroke distance 327 from the crankshaft axis of rotation 312. The sixth crankpin 334 is mechanically coupled to a piston that interacts with a third EGR-consuming cylinder 337, and the sixth crankpin axis 336 is spaced radially a semi-stroke distance 335 from the crankshaft axis of rotation 312. The eighth crankpin 342 is mechanically coupled to a piston that interacts with a fourth EGR-consuming cylinder 345, and the eighth crankpin axis 344 is spaced radially a semi-stroke distance 343 from the crankshaft axis of rotation 312. In an exemplary embodiment, semi-stroke distances 319, 327, 335, and 343 are equal to one another (i.e., equal to a second semi-stroke distance). In an exemplary embodiment, semi-stroke distances 319, 327, 335, and 343 are greater than semi-stroke distances 315, 323, 331, and 339.

A first pair of crank arms 346 is joined to first crankpin 314 and second crankpin 318 for force transmission among first crankpin 314, second crankpin 318, and the first pair of crank arms 346. Each of the crank arms 346 is also joined to a respective main journal 302, 304 for transmitting torque between the first pair of crank arms 346 and the main journals 302, 304. A second pair of crank arms 348 is joined to third crankpin 322 and fourth crankpin 326 for force transmission among third crankpin 322, fourth crankpin 326, and the second pair of crank arms 348. Each of the crank arms 348 is also joined to a respective main journal 304, 306 for transmitting torque between the second pair of crank arms 348 and the main journals 304, 306. A third pair of crank arms 350 is joined to fifth crankpin 330 and sixth crankpin 334 for force transmission among fifth crankpin 330, sixth crankpin 334, and the third pair of crank arms 350. Each of the crank arms 350 is also joined to a respective main journal 306, 308 for transmitting torque between the third pair of crank arms 350 and the main journals 306, 308. A fourth pair of crank arms 352 is joined to seventh crankpin 338 and eighth crankpin 342 for force transmission among seventh crankpin 338, eighth crankpin 342, and the fourth pair of crank arms 352. Each of the crank arms 352 is also joined to a respective main journal 308, 310 for transmitting torque between the third pair of crank arms 352 and the main journals 308, 310.

In an exemplary embodiment, the crankpins 314, 318, 322, 326, 330, 334, 338, and 342 arranged to enable, with respect to their associated cylinders, a "near-even fire" combustion sequence. Thus, in an exemplary embodiment with four EGR-producing cylinders 12 and four EGR consuming cylinders 16, eight nearly evenly spaced firing events are produced in about 720 degrees of rotation of the crankshaft. In an exemplary embodiment, since eight cylinders of an exemplary engine comprise equal numbers of EGR-producing cylinders 12 and EGR-consuming cylinders 16, the firing events associated with the EGR-producing cylinders 12 are alternated with the firing events associated with the EGR-consuming cylinders 16.

In an exemplary embodiment, a firing event associated with the first EGR-producing cylinder 317 is followed, after approximately 90 degrees of rotation of the crankshaft, by a firing event of the first EGR-consuming cylinder 321. After another approximately 90 degrees of rotation of the crankshaft (i.e., a total of approximately 180 degrees of rotation), the firing event of the first EGR-consuming cylinder 321 is followed by a firing event associated with another of the EGR-producing cylinders, such as the third EGR-producing cylinder 333. After another approximately 90 degrees of rotation of the crankshaft (i.e., a total of approximately 270 degrees of rotation), another firing event of an EGR-consuming cylinder, such as the third EGR-consuming cylinder 337, occurs. After another approximately 90 degrees of rotation of the crankshaft (i.e., a total of approximately 360 degrees of rotation), another firing event associated with an EGR-producing cylinder, such as the fourth EGR-producing cylinder 341, occurs. After another approximately 90 degrees of rotation of the crankshaft (i.e., a total of approximately 450 degrees of rotation), a firing event of another EGR-consuming cylinder, such as the fourth EGR-consuming cylinder 345, occurs. After another approximately 90 degrees of rotation of the crankshaft (i.e., a total of approximately 540 degrees of rotation), a firing event associated with another EGR-producing cylinder, such as the second EGR-producing cylinder 325, occurs. After another approximately 90 degrees of rotation of the crankshaft (i.e., a total of approximately 630 degrees of rotation), a firing event of another EGR-consuming cylinder, such as the second EGR-consuming cylinder 329, occurs. Finally, after another approximately 90 degrees of rotation of the crankshaft (i.e., a total of approximately 720 degrees of rotation), a firing event of another EGR-consuming cylinder, such as the first EGR-producing cylinder 317, occurs again, continuing the cycle.

In an exemplary embodiment, the sequential firing of the first EGR-producing cylinder 317 and the first EGR-consuming cylinder 321 is followed by the sequential firing of the third EGR-producing cylinder 333 and the third EGR-consuming cylinder 337. The sequential firing of the third EGR-producing cylinder 333 and the third EGR-consuming cylinder 337 is then followed by the sequential firing of the fourth EGR-producing cylinder 341 and the fourth EGR-consuming cylinder 345. The sequential firing of the fourth EGR-producing cylinder 341 and the fourth EGR-consuming cylinder 345 is then followed by the sequential firing of the second EGR-producing cylinder 325 and the second EGR-consuming cylinder 329. Finally, the sequential firing of the second EGR-producing cylinder 325 and the second EGR-consuming cylinder 329 is followed by the sequential firing of the first EGR-producing cylinder 317 and the first EGR-consuming cylinder 321 so as to begin a repetition of the firing sequence.

In an exemplary embodiment, the first crankpin 314 is coupled, through a connecting rod (not shown), to a piston (not shown) that is disposed in the first EGR-producing cylinder 317. The first EGR-producing cylinder 317 is configured (i.e., has valves timed to open and close) so as to operate on a four-stroke combustion cycle. Thus, as crankshaft 300 rotates about the crankshaft axis of rotation 312, the piston that is coupled to the first crankpin 314 interacts with working fluid (i.e., fuel, air and EGR mixture) in the first EGR-producing cylinder 317 and encounters a combustion event once for every 720 degrees of crankshaft rotation.

Similarly, the third crankpin 322 is coupled, through a connecting rod (not shown), to a piston (not shown) that is disposed in the second EGR-producing cylinder 325. The second EGR-producing cylinder 325 is configured (i.e., has valves timed to open and close) so as to operate on a four-stroke combustion cycle. Thus, as crankshaft 300 rotates about the crankshaft axis of rotation 312, the piston that is coupled to the third crankpin 322 interacts with working fluid (i.e., fuel, air and EGR mixture) in the second EGR-producing cylinder 325 and encounters a combustion event once for every 720 degrees of crankshaft rotation.

Figure 4:
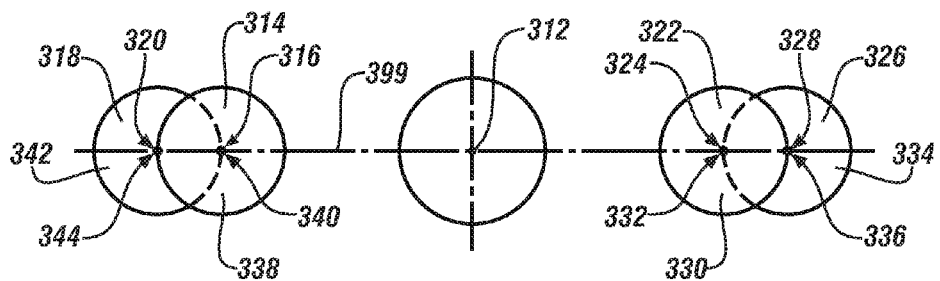
FIG. 4 is a schematic plan view of portions of an internal combustion engine system embodying features of another embodiment of the invention.

In an exemplary embodiment, the combustion event associated with the second EGR-producing cylinder 325 occurs approximately 540 degrees of crankshaft rotation after the firing of the first EGR-producing cylinder 317. Accordingly, as shown in FIG. 4, the third crankpin 322 is disposed approximately 180 degrees from the position of the first crankpin 314, such that the piston associated with the third crankpin 322 reaches the top of its stroke approximately 180 degrees after the piston associated with the first crankpin 314 reaches the top of its stroke. Since the third crankpin 322 is disposed approximately 180 degrees from the position of the first crankpin 314, the third crankpin axis 324 is disposed in approximately the same plane 399 as the first crankpin axis 316 and the crankshaft axis of rotation 312.

Similarly, the fifth crankpin 330 is coupled, through a connecting rod (not shown), to a piston (not shown) that is disposed in the third EGR-producing cylinder 333. The third EGR-producing cylinder 333 is configured (i.e., has valves timed to open and close) so as to operate on a four-stroke combustion cycle. Thus, as crankshaft 300 rotates about the crankshaft axis of rotation 312, the piston that is coupled to the fifth crankpin 330 interacts with working fluid (i.e., fuel, air and EGR mixture) in the third EGR-producing cylinder 333 and encounters a combustion event once for every 720 degrees of crankshaft rotation. In an exemplary embodiment, the combustion event associated with the third EGR-producing cylinder 333 occurs approximately 180 degrees of crankshaft rotation after the firing of the first EGR-producing cylinder 317. Accordingly, as shown in FIG. 4, the fifth crankpin 330 is disposed approximately 180 degrees from the position of the first crankpin 314, such that the piston associated with the fifth crankpin 330 reaches the top of its stroke approximately 180 degrees after the piston associated with the first crankpin 314 reaches the top of its stroke. Since the fifth crankpin 330 is disposed approximately 180 degrees from the position of the first crankpin 314, the fifth crankpin axis 332 is disposed in approximately the same plane as the first crankpin axis 316 and the crankshaft axis of rotation 312.

Similarly, the seventh crankpin 338 is coupled, through a connecting rod (not shown), to a piston (not shown) that is disposed in the fourth EGR-producing cylinder 341. The fourth EGR-producing cylinder 341 is configured (i.e., has valves timed to open and close) so as to operate on a four-stroke combustion cycle. Thus, as crankshaft 300 rotates about the crankshaft axis of rotation 312, the piston that is coupled to the seventh crankpin 338 interacts with working fluid (i.e., fuel, air and EGR mixture) in the fourth EGR-producing cylinder 341 and encounters a combustion event once for every 720 degrees of crankshaft rotation. In an exemplary embodiment, the combustion event associated with the fourth EGR-producing cylinder 341 occurs approximately 360 degrees of crankshaft rotation after the firing of the first EGR-producing cylinder 317. Accordingly, as shown in FIG. 4, the seventh crankpin 338 is disposed at approximately the same rotational position as (i.e., rotated approximately 0 degrees from the position of) the first crankpin 314, such that the piston associated with the fifth crankpin 338 reaches the top of its stroke at approximately the same time as the piston associated with the first crankpin 314 reaches the top of its stroke. Since the seventh crankpin 338 is disposed at approximately the same rotational position as the first crankpin 314, the seventh crankpin axis 340 is disposed in approximately the same plane as the first crankpin axis 316 and the crankshaft axis of rotation 312.

Similarly, the second crankpin 318 is coupled, through a connecting rod (not shown), to a piston (not shown) that is disposed in the first EGR-consuming cylinder 321. The first EGR-consuming cylinder 321 is configured (i.e., has valves timed to open and close) so as to operate on a four-stroke combustion cycle. Thus, as crankshaft 300 rotates about the crankshaft axis of rotation 312, the piston that is coupled to the second crankpin 318 interacts with working fluid (i.e., fuel, air and EGR mixture) in the first EGR-consuming cylinder 321 and encounters a combustion event once for every 720 degrees of crankshaft rotation. In an exemplary embodiment, the combustion event associated with the first EGR-consuming cylinder 321 occurs approximately 90 degrees of crankshaft rotation after the firing of the first EGR-producing cylinder 317. In an exemplary embodiment, wherein a bank plane 15 of the EGR-producing cylinders 12 is oriented 90 degrees from a bank plane 19 of EGR-consuming cylinders 16, a piston operating in an EGR-consuming cylinder, such as first EGR-consuming cylinder 321 may reach the top of its stroke approximately 90 degrees of rotation of the crankshaft after the piston operating in the first EGR-producing cylinder 317 reaches the top of its stroke, even though, as shown in FIG. 4, the second crankpin 318 is disposed at approximately the same rotational position as the first crankpin 314. Since the second crankpin 318 is disposed at approximately the same rotational position as the first crankpin 314, the second crankpin axis 320 is disposed in approximately the same plane as the first crankpin axis 316 and the crankshaft axis of rotation 312.

Similarly, the fourth crankpin 326 is coupled, through a connecting rod (not shown), to a piston (not shown) that is disposed in the second EGR-consuming cylinder 329. The second EGR-consuming cylinder 329 is configured (i.e., has valves timed to open and close) so as to operate on a four-stroke combustion cycle. Thus, as crankshaft 300 rotates about the crankshaft axis of rotation 312, the piston that is coupled to the fourth crankpin 326 interacts with working fluid (i.e., fuel, air and EGR mixture) in the second EGR-consuming cylinder 329 and encounters a combustion event once for every 720 degrees of crankshaft rotation. In an exemplary embodiment, the combustion event associated with the second EGR-consuming cylinder 329 occurs approximately 630 degrees of crankshaft rotation after the firing of the first EGR-producing cylinder 317. In an exemplary embodiment, wherein a bank plane 15 of the EGR-producing cylinders 12 is oriented 90 degrees from a bank plane 19 of EGR-consuming cylinders 16, a piston operating in an EGR-consuming cylinder, such as the second EGR-consuming cylinder 329 may reach the top of its stroke approximately 630 degrees of rotation of the crankshaft after the piston operating in the first EGR-producing cylinder 317 reaches the top of its stroke, so long as the fourth crankpin 326 is disposed, as shown in FIG. 4, approximately 180 degrees from the position of the first crankpin 314. Since the fourth crankpin 326 is disposed approximately 180 degrees from the position of the first crankpin 314, the fourth crankpin axis 328 is disposed in approximately the same plane as the first crankpin axis 316 and the crankshaft axis of rotation 312.

Similarly, the sixth crankpin 334 is coupled, through a connecting rod (not shown), to a piston (not shown) that is disposed in the third EGR-consuming cylinder 337. The third EGR-consuming cylinder 337 is configured (i.e., has valves timed to open and close) so as to operate on a four-stroke combustion cycle. Thus, as crankshaft 300 rotates about the crankshaft axis of rotation 312, the piston that is coupled to the sixth crankpin 334 interacts with working fluid (i.e., fuel, air and EGR mixture) in the third EGR-consuming cylinder 337 and encounters a combustion event once for every 720 degrees of crankshaft rotation. In an exemplary embodiment, the combustion event associated with the third EGR-consuming cylinder 337 occurs approximately 270 degrees of crankshaft rotation after the firing of the first EGR-producing cylinder 317. In an exemplary embodiment, wherein a bank plane 15 of the EGR-producing cylinders 12 is oriented 90 degrees from a bank plane 19 of EGR-consuming cylinders 16, a piston operating in an EGR-consuming cylinder, such as the third EGR-consuming cylinder 337 may reach the top of its stroke approximately 270 degrees of rotation of the crankshaft after the piston operating in the first EGR-producing cylinder 317 reaches the top of its stroke, so long as the sixth crankpin 334 is disposed, as shown in FIG. 4, approximately 180 degrees from the position of the first crankpin 314. Since the sixth crankpin 334 is disposed approximately 180 degrees from the position of the first crankpin 314, the fourth crankpin axis 336 is disposed in approximately the same plane as the first crankpin axis 316 and the crankshaft axis of rotation 312.

Similarly, the eighth crankpin 342 is coupled, through a connecting rod (not shown), to a piston (not shown) that is disposed in the fourth EGR-consuming cylinder 345. The fourth EGR-consuming cylinder 345 is configured (i.e., has valves timed to open and close) so as to operate on a four-stroke combustion cycle. Thus, as crankshaft 300 rotates about the crankshaft axis of rotation 312, the piston that is coupled to the eighth crankpin 342 interacts with working fluid (i.e., fuel, air and EGR mixture) in the fourth EGR-consuming cylinder 345 and encounters a combustion event once for every 720 degrees of crankshaft rotation. In an exemplary embodiment, the combustion event associated with the fourth EGR-consuming cylinder 345 occurs approximately 450 degrees of crankshaft rotation after the firing of the first EGR-producing cylinder 317. In an exemplary embodiment, wherein a bank plane 15 of the EGR-producing cylinders 12 is oriented 90 degrees from a bank plane 19 of EGR-consuming cylinders 16, a piston operating in an EGR-consuming cylinder, such as the fourth EGR-consuming cylinder 345 may reach the top of its stroke approximately 450 degrees of rotation of the crankshaft after the piston operating in the first EGR-producing cylinder 317 reaches the top of its stroke, so long as the eighth crankpin 342 is disposed, as shown in FIG. 4, at approximately the same rotational position as the first crankpin 314. Since the eighth crankpin 342 is disposed approximately 180 degrees from the position of the first crankpin 314, the eighth crankpin axis 344 is disposed in approximately the same plane as the first crankpin axis 316 and the crankshaft axis of rotation 312.

In accordance with this embodiment, the first crankpin 314, the second crankpin 318, the seventh crankpin 338, and the eighth crankpin 342 are all oriented at approximately the same rotational position of the crankshaft. In addition, the third crankpin 322, the fourth crankpin 326, the fifth crankpin 330, and the sixth crankpin 334 are all oriented at approximately the same rotational position of the crankshaft, approximately 180 degrees of rotation apart from (i.e., out of phase from) the position of the first crankpin 314, the second crankpin 318, the seventh crankpin 338, and the eighth crankpin 342. Thus, the first crankpin axis 316, the second crankpin axis 320, the third crankpin axis 324, the fourth crankpin axis 328, the fifth crankpin axis 332, and the sixth crankpin axis 336, the seventh crankpin axis 340, and the eighth crankpin axis 344 are all arranged approximately in a single plane with the crankshaft axis of rotation 312.

Accordingly, in an exemplary embodiment, the crankpins associated with two of the EGR-producing cylinders (e.g., the first crankpin 314 and the seventh crankpin 338) and the crankpins associated with two of the EGR-consuming cylinders (e.g., the second crankpin 318 and the eighth crankpin 342) are positioned approximately in phase with one another (i.e., approximately positioned for in-phase rotation about the crankshaft axis of rotation). In addition, the crankpins associated with other two of the EGR-producing cylinders (e.g., the third crankpin 322 and the fifth crankpin 330) and the crankpins associated with other two of the EGR-consuming cylinders (e.g., the fourth crankpin 326 and the sixth crankpin 334) are all positioned approximately 180 degrees out of phase from the crankpins of the first-mentioned two EGR-producing cylinders (e.g., the first crankpin 314 and the seventh crankpin 338) and the crankpins associated with the first-mentioned two EGR-consuming cylinders (e.g., the second crankpin 318 and the eighth crankpin 342). Such a configuration will yield 8 substantially evenly spaced firing or combustion events in about 720 degrees of crankshaft rotation.

Figure 5:
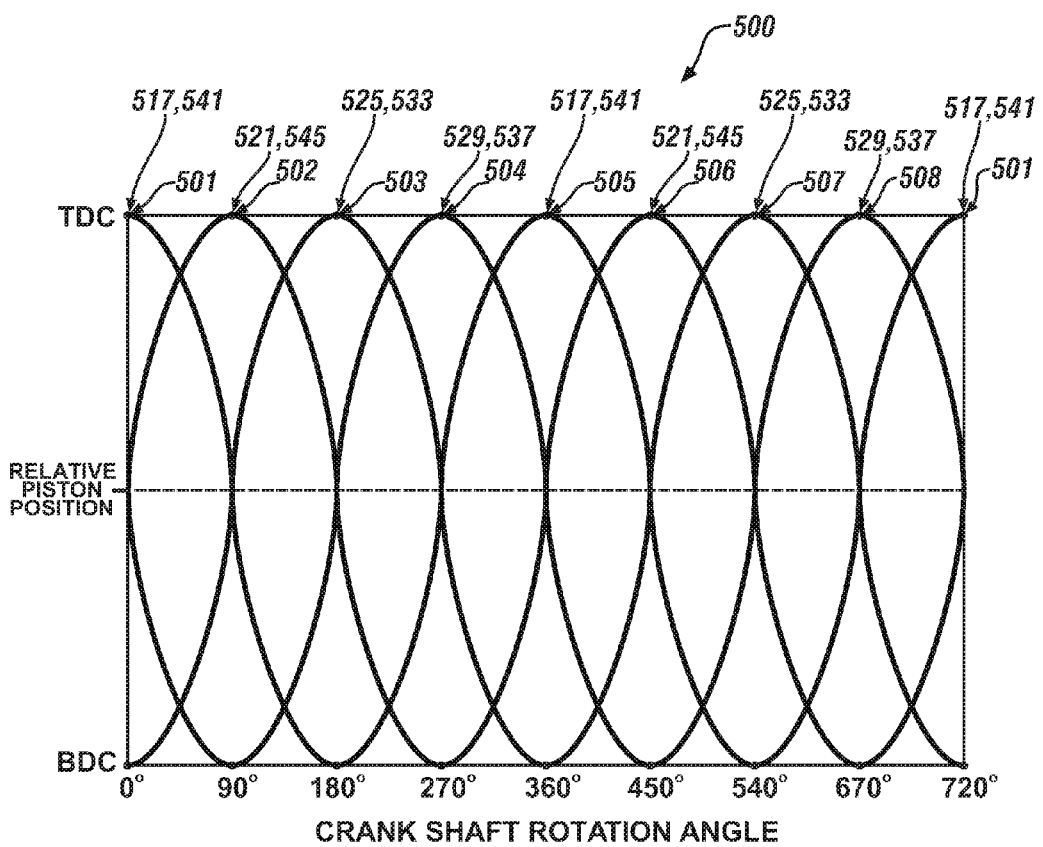
FIG. 5 is a graph depicting operation of an internal combustion engine system embodying features of another embodiment of the invention.

FIG. 5 shows an exemplary relationship 500 between relative piston position and crankshaft rotational position for exemplary engine rotating groups. In an exemplary embodiment, as shown in FIG. 4, the first crankpin 314, the second crankpin 318, the seventh crankpin 338, and the eighth crankpin 342 are disposed at a first rotational position of the crankshaft 300 such that the pistons disposed in the first EGR-producing cylinder 317 and the fourth EGR-producing cylinder 341 reach the top of their strokes (i.e., TDC) at approximately the same rotational position 517, 541 and such that the pistons disposed in the first EGR-consuming cylinder 321 and the fourth EGR-consuming cylinder 345 reach the top of their strokes (i.e., TDC) at a rotational position 521, 545 approximately 90 degrees later (i.e., after approximately 90 degrees of crankshaft rotation). In addition, the third crankpin 322, the fourth crankpin 326, the fifth crankpin 330, and the sixth crankpin 334 are disposed at a second rotational position of the crankshaft 300 approximately 180 degrees out of phase from the first position such that the pistons disposed in the second EGR-producing cylinder 325 and the third EGR-producing cylinder 333 reach the top of their strokes (i.e., TDC) at a crankshaft rotational position 525, 533 after approximately 180 degrees of crankshaft rotation, and such that the pistons disposed in the second EGR-consuming cylinder 329 and the third EGR-consuming cylinder 337 reach the top of their strokes (i.e., TDC) at a crankshaft rotational position 529, 537 of approximately 270 degrees of crankshaft rotation.

At an approximate rotational position 517 (with variations associated with advancement or retarding of the ignition timing) of 0 degrees, the first crankpin 314 is positioned such that the piston interacting with the first EGR-producing cylinder 317 is at the top of its stroke while a first combustion or firing event 501 occurs in the first EGR-producing cylinder 317. At an approximate rotational position 521 (with variations associated with advancement or retarding of the ignition timing) of 90 degrees, the second crankpin 318 is positioned such that the piston interacting with the first EGR-consuming cylinder 321 is at the top of its stroke while a second combustion or firing event 502 occurs in the first EGR-consuming cylinder 321. At an approximate rotational position 533 (with variations associated with advancement or retarding of the ignition timing) of 180 degrees, the fifth crankpin 330 is positioned such that the piston interacting with the third EGR-producing cylinder 333 is at the top of its stroke while a third combustion or firing event 503 occurs in the third EGR-producing cylinder 333. At an approximate rotational position 537 (with variations associated with advancement or retarding of the ignition timing) of 270 degrees, the sixth crankpin 334 is positioned such that the piston interacting with the third EGR-consuming cylinder 337 is at the top of its stroke while a fourth combustion or firing event 504 occurs in the third EGR-consuming cylinder 337.

At an approximate rotational position 541 (with variations associated with advancement or retarding of the ignition timing) of 360 degrees, the seventh crankpin 338 is positioned such that the piston interacting with the fourth EGR-producing cylinder 341 is at the top of its stroke while a fifth combustion or firing event 505 occurs in the fourth EGR-producing cylinder 341. At an approximate rotational position 545

(with variations associated with advancement or retarding of the ignition timing) of 450 degrees, the eighth crankpin 342 is positioned such that the piston interacting with the fourth EGR-consuming cylinder 345 is at the top of its stroke while a sixth combustion or firing event 506 occurs in the fourth EGR-consuming cylinder 345. At an approximate rotational position 525 (with variations associated with advancement or retarding of the ignition timing) of 540 degrees, the third crankpin 322 is positioned such that the piston interacting with the second EGR-producing cylinder 325 is at the top of its stroke while a seventh combustion or firing event 507 occurs in the second EGR-producing cylinder 325. At an approximate rotational position 529 (with variations associated with advancement or retarding of the ignition timing) of 630 degrees, the fourth crankpin 326 is positioned such that the piston interacting with the second EGR-consuming cylinder 329 is at the top of its stroke while an eighth combustion or firing event occurs in the second EGR-consuming cylinder 329. Finally, At an approximate rotational position 517 (with variations associated with advancement or retarding of the ignition timing) of 720 degrees, the first crankpin 314 is again positioned such that the piston interacting with the first EGR-producing cylinder is at the top of its stroke while a first combustion or firing event 501 repeats in the first EGR-producing cylinder 317.

Thus, a "near-even fire" combustion sequence is facilitated, whereby, in the case of an 8-cylinder internal combustion engine, eight nearly evenly spaced firing events occur in about 720 degrees of rotation of the crankshaft. The invention has been described above primarily with reference to its application in an 8-cylinder engine. It should be clear to one skilled in the art of internal combustion engines that engines of other cylinder numbers, and varied configurations, can easily be envisaged and that the invention should not, and cannot be limited to those examples provided herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. An internal combustion engine comprising a crankshaft, the crankshaft comprising:
   at least five main journals aligned on a crankshaft axis of rotation; and
   at least eight crankpins, each of the at least eight crankpins being disposed about a respective crankpin axis of rotation and positioned between the at least five main journals;
   each of the respective crankpin axes of rotation being oriented parallel to, and spaced radially from, the crankshaft axis of rotation;
   each of the at least eight crankpins being joined to a respective pair of crank arms for force transmission between each of the at least eight crankpins and the respective pair of crank arms;
   each crank arm being joined to a respective main journal for transmitting torque between the crank arm and the main journal;
   each respective crankpin axis of rotation of the at least eight crankpins and the crankshaft axis of rotation being disposed approximately in a single plane;
   said at least eight crankpins comprising a first set of four crankpins and a second set of four crankpins;
   each respective crankpin axis of rotation of the first set of four crankpins being spaced radially a first semi-stroke distance from the crankshaft axis of rotation, and each respective crankpin axis of rotation of the second set of four crankpins being spaced radially a second semi-stroke distance from the crankshaft axis of rotation;
   wherein the first semi-stroke distance differs from the second semi-stroke distance.

2. An internal combustion engine as in claim 1, wherein the at least eight crankpins comprise four pairs of crankpins, each pair of crankpins being disposed between two of the at least five main journals.

3. An internal combustion engine as in claim 2, wherein at least one of the four pairs of crankpins comprises a first crankpin disposed about a first crankpin axis of rotation and a second crankpin disposed about a second crankpin axis of rotation, wherein the first crankpin axis of rotation is radially spaced the first semi-stroke distance from the crankshaft axis of rotation, and wherein the second crankpin axis of rotation is radially spaced the second semi-stroke distance from the crankshaft axis of rotation.

4. An internal combustion engine as in claim 3, wherein the first semi-stroke distance is greater than the second semi-stroke distance.

5. An internal combustion engine as in claim 2, wherein each pair of crankpins comprises a first crankpin disposed about a first crankpin axis of rotation and a second crankpin disposed about a second crankpin axis of rotation, wherein the first crankpin axis of rotation is radially spaced the first semi-stroke distance from the crankshaft axis of rotation, and wherein the second crankpin axis of rotation is radially spaced the second semi-stroke distance from the crankshaft axis of rotation.

6. An internal combustion engine as in claim 5, wherein the first semi-stroke distance is greater than the second semi-stroke distance.

7. An internal combustion engine as in claim 1, wherein the first semi-stroke distance is greater than the second semi-stroke distance.

8. A crankshaft for an internal combustion engine comprising:
   at least five main journals aligned on a crankshaft axis of rotation; and at least eight crankpins, each of the at least eight crankpins being disposed about a respective crankpin axis of rotation and positioned between the at least five main journals, said at least eight crankpins comprising a first set of four crankpins and a second set of four crankpins;
   each of the respective crankpin axes of rotation being oriented parallel to, and spaced radially from, the crankshaft axis of rotation;
   each of the at least eight crankpins being joined to a respective pair of crank arms for force transmission between each crankpin and the respective pair of crank arms;
   each crank arm being joined to a respective main journal for transmitting torque between the crank arm and the main journal;
   wherein each respective crankpin axis of rotation of the at least eight crankpins and the crankshaft axis of rotation are disposed approximately in a single plane;
   wherein each respective crankpin axis of rotation of the first set of four crankpins is spaced radially a first semi-stroke distance from the crankshaft axis of rotation, and each respective crankpin axis of rotation of the second set of four crankpins is spaced radially a second semi-stroke distance from the crankshaft axis of rotation; wherein the first semi-stroke distance differs from the second semi-stroke distance.

9. A crankshaft for an internal combustion engine as in claim 8, wherein the at least eight crankpins comprise four pairs of crankpins, each pair of crankpins being disposed between two of the at least five main journals.

10. A crankshaft for an internal combustion engine as in claim 9, wherein at least one of the four pairs of crankpins comprises a first crankpin disposed about a first crankpin axis of rotation and a second crankpin disposed about a second crankpin axis of rotation, wherein the first crankpin axis of rotation is radially spaced the first semi-stroke distance from the crankshaft axis of rotation, and wherein the second crankpin axis of rotation is radially spaced the second semi-stroke distance from the crankshaft axis of rotation.

11. A crankshaft for an internal combustion engine as in claim 10, wherein the first semi-stroke distance is different from the second semi-stroke distance.

12. A crankshaft for an internal combustion engine as in claim 9, wherein each pair of crankpins comprises a first crankpin disposed about a first crankpin axis of rotation and a second crankpin disposed about a second crankpin axis of rotation, wherein the first crankpin axis of rotation is radially spaced the first semi-stroke distance from the crankshaft axis of rotation, and wherein the second crankpin axis of rotation is radially spaced the second semi-stroke distance from the crankshaft axis of rotation.

13. A crankshaft for an internal combustion engine as in claim 12, wherein the first semi-stroke distance is different from the second semi-stroke distance.

14. A crankshaft for an internal combustion engine comprising:
at least five main journals aligned on a crankshaft axis of rotation; and
at least eight crankpins, each of the at least eight crankpins being disposed about a respective crankpin axis of rotation and positioned between the at least five main journals;
each of the respective crankpin axes of rotation being oriented parallel to, and spaced radially from, the crankshaft axis of rotation;
each of the at least eight crankpins being joined to a respective pair of crank arms for force transmission between each of the at least eight crankpins and the respective pair of crank arms;
each crank arm being joined to a respective main journal for transmitting torque between the crank arm and the main journal;
wherein a first set of crankpins comprises at least four of the at least eight crankpins, wherein a second set of crankpins comprises a remaining at least four of the at least eight crankpins;
wherein the first set of crankpins is disposed approximately 180 degrees out of phase from the second set of crankpins;
wherein each respective crankpin axis of rotation of the first set of crankpins is spaced radially a first semi-stroke distance from the crankshaft axis of rotation, and each respective crankpin axis of rotation of the second set of crankpins is spaced radially a second semi-stroke distance from the crankshaft axis of rotation;
wherein the first semi-stroke distance differs from the second semi-stroke distance.

15. A crankshaft for an internal combustion engine as in claim 14, wherein the first set of crankpins comprises two crankpins disposed the first semi-stroke distance from the crankshaft axis of rotation and two crankpins disposed the second semi-stroke distance from the crankshaft axis of rotation; and wherein the second set of crankpins comprises two crankpins disposed the first semi-stroke distance from the crankshaft axis of rotation and two crankpins disposed the second semi-stroke distance from the crankshaft axis of rotation.

16. A crankshaft for an internal combustion engine as in claim 15, wherein the first semi-stroke distance is greater than the second semi-stroke distance.

17. A crankshaft for an internal combustion engine as in claim 15:
wherein the at least five main journals comprises a first main journal, a second main journal, a third main journal, a fourth main journal, and a fifth main journal disposed sequentially along the crankshaft axis of rotation;
wherein the at least eight crankpins comprises a first crankpin, a second crankpin, a third crankpin, a fourth crankpin, a fifth crankpin, a sixth crankpin, a seventh crankpin, and an eighth crankpin disposed sequentially along the crankshaft; and
wherein the first set of crankpins comprises the first crankpin and the second crankpin disposed between the first main journal and the second main journal and the seventh crankpin and the eighth crankpin disposed between the fourth main journal and the fifth main journal.

18. A crankshaft for an internal combustion engine as in claim 15:
wherein the at least five main journals comprises a first main journal, a second main journal, a third main journal, a fourth main journal, and a fifth main journal disposed sequentially along the crankshaft axis of rotation;
wherein the at least eight crankpins comprises a first crankpin, a second crankpin, a third crankpin, a fourth crankpin, a fifth crankpin, a sixth crankpin, a seventh crankpin, and an eighth crankpin disposed sequentially along the crankshaft; and
wherein the second set of crankpins comprises the third crankpin and the fourth crankpin disposed between the second main journal and the third main journal and the fifth crankpin and the sixth crankpin disposed between the third main journal and the fourth main journal.

19. A crankshaft for an internal combustion engine as in claim 15:
wherein the at least five main journals comprises a first main journal, a second main journal, a third main journal, a fourth main journal, and a fifth main journal disposed sequentially along the crankshaft axis of rotation;
wherein the at least eight crankpins comprises a first crankpin, a second crankpin, a third crankpin, a fourth crankpin, a fifth crankpin, a sixth crankpin, a seventh crankpin, and an eighth crankpin disposed sequentially along the crankshaft;
wherein the first set of crankpins comprises the first crankpin and the second crankpin disposed between the first main journal and the second main journal and the seventh crankpin and the eighth crankpin disposed between the fourth main journal and the fifth main journal; and
wherein the second set of crankpins comprises the third crankpin and the fourth crankpin disposed between the second main journal and the third main journal and the fifth crankpin and the sixth crankpin disposed between the third main journal and the fourth main journal.

\* \* \* \* \*